(12) United States Patent
Kuzmin et al.

(10) Patent No.: US 8,786,286 B2
(45) Date of Patent: Jul. 22, 2014

(54) BUCKING COIL AND B-FIELD MEASUREMENT SYSTEM AND APPARATUS FOR TIME DOMAIN ELECTROMAGNETIC MEASUREMENTS

(75) Inventors: Petr Valentinovich Kuzmin, Aurora (CA); Edward Beverly Morrison, King City (CA)

(73) Assignee: Geotech Airborne Limited, St. Micheal (BB)

( * ) Notice: Subject to any disclaimer, the term of this patent is extended or adjusted under 35 U.S.C. 154(b) by 0 days.

(21) Appl. No.: 13/061,350

(22) PCT Filed: Aug. 28, 2009

(86) PCT No.: PCT/CA2009/001197
§ 371 (c)(1),
(2), (4) Date: Feb. 28, 2011

(87) PCT Pub. No.: WO2010/022515
PCT Pub. Date: Mar. 4, 2010

(65) Prior Publication Data
US 2011/0148421 A1 Jun. 23, 2011

(51) Int. Cl.
*G01V 3/16* (2006.01)
(52) U.S. Cl.
USPC .......................... 324/331; 324/330; 324/365
(58) Field of Classification Search
USPC .................................. 324/330–331, 365
See application file for complete search history.

(56) References Cited

U.S. PATENT DOCUMENTS

| 7,148,690 | B2 | 12/2006 | Hollis |
| 7,157,914 | B2 | 1/2007 | Morrison et al. |
| 2003/0155998 | A1 | 8/2003 | Takeshima et al. |
| 2003/0169045 | A1 | 9/2003 | Whitton |
| 2004/0207403 | A1 | 10/2004 | Fanini et al. |
| 2005/0001622 | A1 | 1/2005 | Morrison et al. |
| 2006/0197531 | A1 | 9/2006 | Hollis |

FOREIGN PATENT DOCUMENTS

| WO | 2007/045963 A2 | 4/2007 |
| WO | 2007045963 A3 | 4/2007 |

OTHER PUBLICATIONS

International Search Report (PCT/ISA/210 & PCT/ISA/237) mailed Dec. 11, 2009.
Smith, R.S., Annan, A.P.: "Using an Induction Coil Sensor to Indirectly Measure the B-filed Response in the Bandwidth of the Transient Electromagnet Method", Geophysics, Oct. 2000, pp. 1489-1494, vol. 65, XP000002658207.
The Extended European Search Report issued in a corresponding European application dated Sep. 5, 2011.
The office Action issued in a corresponding US application dated Aug. 3, 2011.
U.S. Office Action for Corresponding U.S. Appl. No. 12/201,305, dated Feb. 23, 2012, 13 pages.

*Primary Examiner* — Bot Ledynh
(74) *Attorney, Agent, or Firm* — Novak Druce Connolly Bove + Quigg LLP (57) ABSTRACT

According to one example embodiment is a time domain electromagnetic (TDEM) geophysical survey system for producing a B-field measurement, comprising: a transmitter coil; a bucking coil positioned in a substantially concentric and coplanar orientation relative to the transmitter coil; a receiver coil positioned in a substantially concentric and coplanar orientation relative to the bucking coil; an electrical current source connected to the transmitter coil and bucking coil for applying a periodic current thereto; and a data collection system configured to receive a magnetic field time-derivative signal dB/dt from the receiver coil and integrate the magnetic field time-derivative signal dB/dt to generate, a magnetic B-field measurement, the transmitter coil, bucking coil and receiver coil being positioned relative to each other such that, at the location of the receiver coil, a magnetic field generated by the bucking coil has a cancelling effect on a primary magnetic field generated by the transmitter coil.

6 Claims, 6 Drawing Sheets

BUCKING COIL AND B-FIELD MEASUREMENT SYSTEM AND APPARATUS FOR TIME DOMAIN ELECTROMAGNETIC MEASUREMENTS

This application claims priority to U.S. patent application. Ser. No. 12/201,305 filed Aug. 29, 2008, the contents of which are incorporated herein by reference.

FIELD

The following disclosure relates in general to the field of geophysical electromagnetic measurements and more particularly to a method and system of obtaining a B-field using time domain electromagnetic measurements generated by way of an apparatus including a bucking coil and a signal processing means.

BACKGROUND

Geophysical electromagnetic (EM) techniques may be effective in the determination of the electrical conductivity of soils, rocks and other conductive material at depths from the surface up to about three kilometers. Conductivity distribution at such depths is of great interest to those involved in mapping base metal and uranium deposits, aquifers and other geological formations.

Geophysical EM methods involve measurement of time-varying magnetic fields near the earth's surface produced by a primary magnetic field and modeling of the ground conductivity distributions. These magnetic fields are generated either by a periodic current applied to a transmitter, or by naturally occurring electromagnetic fields originating mainly from lightning in the earth's, atmosphere. EM fields can have a characteristic ground penetration depth proportional to the inverse of the square-root of both ground conductivity and frequency.

In known methods, the magnetic field signal is measured using either a receiver coil system (which can measure up to three orthogonal components of the magnetic field time-derivative dB/dt), or a magnetometer (which measures the magnetic field B). The received analog signal is then amplified, filtered, and digitized by a high-resolution high-speed analog-to-digital converter (ADC), and the data may be stored along with the positioning information obtained from a Global Positioning System (GPS). Data post-processing involves electrical and physical, modeling of the ground to generate the geophysical conductivity contour maps.

Existing geophysical surveying methods typically require high signal-to-noise ratio (SNR), high conductivity discrimination, and high spatial resolution both laterally and in depth.

Existing EM systems encompass both ground-based and airborne measurements. Airborne measurements are collected through the use of airplanes and helicopters. Airborne methods are, useful for large area surveys and may be used for exploration of conductive ore bodies buried in resistive bedrock, geological mapping, hydrogeology, and environmental monitoring. Known airborne electromagnetic (AEM) systems function so that the data is acquired while the airplane or helicopter flies at nearly constant speed (e.g. up to 75 m/s, or 30 m/s, respectively) along nearly-parallel equally-spaced lines (e.g. 50 m to 200 m) at close to constant height above ground (e.g. about 120 m or 30 m, respectively). Measurements are taken at regular intervals, typically in the range, 1 m up to 100 m.

An additional feature of known EM measurements is that they can be achieved either in the frequency domain or time domain. In FDEM measurements, the transmitter coil continuously transmits an electromagnetic signal at fixed multiple frequencies, while the receiver coil measures the signal continuously over time. The measured quantities are signal amplitude and phase as a function of frequency, or equivalently, the in-phase and in quadrature amplitudes as a function of frequency. In these measurements, the signal sensitivity is reduced with increasing conductivity, thus reducing the conductivity contrast mapping.

In the course of collecting time TDEM measurements by known methods, a pulse of current is applied to the transmitter coil during an on-period and switched off during the off-period, typically at a repetition rate equal to an odd multiple of half of the local, power line frequency (e.g. typically 50 Hz or 60 Hz). The signal is measured at the receiver as a function of time. The signal amplitude decay during the off-period, combined with modeling of the conductivity and geometry of geological bodies in the ground, yields the conductivity contour maps.

In known TDEM systems, during the current-on-period, weak conductors produce weak dB/dt signals at the receiver coil while good conductors produce large in-phase signals, although quite small compared to the unwanted primary EM field generated by the transmitter coil system. During the current-off-period, weak conductors produce a large dB/dt signal at the receiver coil from a rapidly decaying EM field while good conductors, produce small signals from a slowly decaying EM field. Measurements are: typically made during the off-period, and while measurement of dB/dt is useful to map weak conductors, the measurement of the magnetic field, referred to as the B-field, can increase the accuracy of information provided for good conductors.

In known methods the magnetic field B can be obtained either by direct measurement using a magnetometer or by time-integrating the signal dB/dt measured with a receiver coil. When the magnetic field B is to be obtained by integration, the dB/dt response over the full waveform has to be measured including during the on-period, in order to determine the integration constant that provides a zero DC component over the entire period (see Smith, R. S. and Annan 4.P., "Using an induction coil sensor to indirectly measure the B-field response in the bandwidth of the transient electromagnet method", Geophysics, 65, p. 1489-1494).

An example of a TDEM HTEM system that measures the magnetic filed time derivative dB/dt can be seen for example in U.S. Pat. No. 7,157,914, the contents of which are, incorporated herein by reference.

A TDEM system that can be efficiently operated while effectively measuring the B-Filed is desirable.

SUMMARY OF INVENTION

According to one example embodiment is a time domain electromagnetic (TDEM) geophysical survey system for producing a B-field measurement, comprising: a transmitter coil; a bucking coil positioned in a substantially concentric and coplanar orientation relative to the transmitter coil; a receiver coil positioned in a substantially concentric and coplanar orientation relative to the bucking coil; an electrical current source connected to the transmitter coil and bucking coil for applying a periodic current thereto; and a data collection system configured to receive a magnetic field time-derivative signal dB/dt from the receiver coil and integrate the magnetic, field time-derivative signal dB/dt to generate a magnetic B-field measurement, the transmitter coil, bucking coil and receiver coil being positioned relative to each other such that, at the location of the receiver coil, a magnetic field generated by the bucking coil has a cancelling effect on a primary magnetic field generated by the transmitter coil.

According to another example embodiment is a signal processing method to produce a B-field measurement comprising: obtaining a receiver coil signal from a receiver coil positioned within a bucking coil which is further positioned within a transmitter coil, each coil being positioned in substantially concentric orientation relative to the others, the transmitter coil and the bucking coil generating periodic pulses each having a positive on-time followed by an off-time followed by a negative on-time followed by an off-time; digitizing the receiver coil signal; averaging positive and negative half-cycles of the digitized receiver coil signal over one or more periods to obtain a constant of integration; and integrating the digitized receiver coil signal over at least one entire period to produce the B-field measurement. In one aspect, the present disclosure relates to a HTEM system to produce a B-field measurement comprising: a transmitter coil; a bucking coil positioned in a substantially concentric and coplanar orientation relative to the transmitter coil; a receiver coil positioned in a substantially concentric and coplanar orientation relative to the bucking coil; an electrical current connected to the transmitter coil and bucking coil; and wherein a dB/dt signal is produced by the receiver coil for generation of a B-field measurement.

In another aspect, the present disclosure relates to an electromagnetic measurement data acquisition system comprising: a receiver coil positioned within a bucking coil which is further positioned within a transmitter coil, each coil being substantially concentric to the other said coils and being electrically connected, whereby a receiver coil signal is obtained; a low-noise pre-amplifier whereby the receiver coil signal is amplified to produce a dB/dt signal; a low-pass anti-aliasing filter whereby the dB/dt signal may be filtered; an ADC whereby the filtered signal may be digitized; and a signal processing means, included in the system or linked to the system, to produce a B-field measurement.

In yet another aspect, the present disclosure relates to a signal processing method to produce a B-field measurement comprising: obtaining a receiver coil signal from a receiver coil positioned within a bucking coil which is further positioned within a transmitter coil, each coil being positioned in substantially concentric orientation relative to the others and being electrically connected with one another to produce the receiver coil signal; continuously digitizing the receiver coil signal by way of a ADC that filters the signal; obtaining the digitized signal by a signal processing means unit; eliminating pre-amplifier set-off and temperature-dependent drifts by averaging the signal at a given point of a waveform point-by-point over a set of periods; averaging the waveform over one or more, positive and negative semi-periods or signals to obtain an off-set signal; optionally subtracting a resulting digital signal from each point; integrating the digital signal over at least one entire period so as to produce the B-field measurement; and binning the digital signal into gates with substantially equal time intervals in a logarithmic scale.

In another aspect, the present disclosure relates to an electromagnetic measurement apparatus comprising: a transmitter coil; a bucking coil positioned substantially centrally within the transmitter coil; a receiver coil positioned substantially centrally within the bucking coil; a system of one or more radial cables whereby the transmitter coil, bucking coil and receiver coil are connected in their relative positions; an external suspension system of one or more external cables releasably connected to the transmitter frame; and one or more suspension attachment cables attached to the external suspension system; wherein the transmitter coil, bucking coil and receiver coil are positioned substantially concentrically relative to one another when the attachment cable is lifted vertically to a sufficient height to suspend the transmitter coil, bucking coil and receiver coil and the coils are positioned so as to function to achieve electromagnetic measurements whereby time domain B-field measurements are derived.

In this respect, before explaining at least one embodiment of the invention in detail, it is to be understood that the invention is not limited in its application to the details of construction and to the arrangements of the components set forth in the following description or illustrated in the drawings. The invention is capable of other embodiments arid of being practiced and carried out in various ways. Also, it is to be understood that the phraseology and terminology employed herein are for the purpose of description and should not be regarded as limiting.

BRIEF DESCRIPTION THE DRAWINGS

Example embodiments of the invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF EXAMPLE EMBODIMENTS

There are a number of issues that need to be addressed when attempting to measure the B-field in an airborne TDEM surveying system. For example, acquiring data over the entire period in a concentric dipole HTEM system can be challenging since the signal during the on-period is typically many orders of magnitude higher than during the off-period. As the dynamic range is dictated by the ratio of the signal strength at the receiver coil during the on-period and the off-period of the transmitter coil current, one possible solution is to increase the physical separation between the transmitter and the receiver coils. This large distance has the effect of decreasing the requirement for a large dynamic range for the data acquisition system. However, the separation imposed by the large distances can in some applications introduce negative characteristics such as loss of spatial resolution or a system that is unwieldy and difficult to tow in flight, especially by helicopter. One possible solution to the dynamic range issue is to implement a bucking coil to decrease the amplitude of the primary field at the receiver.

Example embodiments of the present invention relates to an airborne or HTEM system that includes a semi-rigid bucking coil and means for determining the magnetic field. B from the measured magnetic field time-derivative signal dB/dt. The bucking coil may be positioned in a concentric coplanar manner relative to a transmitter coil and receiver coil, in order to minimize spurious signals at the receiver coil during data acquisition time. Signals gathered by the system may be further processed by a signal processing means. Moreover, measurements performed upon data generated by the system may be performed upon the entire period of a current waveform applied to the transmitter and bucking coils.

The addition of a bucking coil can increase the suspension mechanical complexity and structure weight, but has the possible benefit of keeping the signal within the ADC dynamic range, among other things. The positioning and stability of the bucking coil is made possible in example embodiments of the present invention by placing the bucking coil at the centre of the main transmitter coil in order to minimize the magnetic field at the receiver coil.

The means for determining magnetic field B may be implemented as a software utility, running on a computer linked to or part of the HTEM system that uses an algorithm such as the algorithm described below. It should also be understood that the computer and associated software utility may be used in a processing phase after collection of the field data.

Measurement of the B-field can aid the probing of mineral deposits, for example at depths approaching one kilometer and the detection of good conductors in the ground. Embodiments of the present invention may apply a small magnetic dipole moment with fast turn-off, as is appropriate for surveys mapping near-surface conductivity. This aspect of the invention can affect the transmitter coil such that in some applications the required number of turns in the transmitter coil can be reduced to yield a reduced magnetic dipole moment and inductance. Conversely, for the detection of conductors at greater depths, in some applications that employ the system of the present invention the number of turns can be increased to increase the transmitter coil magnetic dipole moment in combination with a longer off-period.

Example embodiments of the present invention may offer some potential benefits. For example, the application of a bucking coil may in at least some configurations reduce the required ADC dynamic range. The effect of this reduction may be to allow for the measurement to include the entire period of the current waveform applied to transmitter and bucking coils, or over an increased period of said current waveform. Acquiring data over the entire transmitter current period can otherwise be challenging since the signal during the on-period is typically many orders of magnitude higher than during the off-period. Thus, example embodiments of the present invention may provide a beneficial EM tool. Embodiments of the present invention can be incorporated into a concentric dipole HTEM system, such as for example for example is disclosed in U.S. Pat. No. 7,157,914, or the Versatile Time Domain Electromagnetic (VTEM) HTEM system operated by Geotech. The HTEM system elements in example embodiments of the present invention may simplify data analysis. For example, positioning the bucking coil concentric with or at the centre of the main transmitter coil may in some applications increase the stability of the bucking coil and can minimize the primary magnetic field at the receiver coil. Deviations in the position of the bucking coil and the receiver coil from an ideal concentric configuration may produce a spurious DC. Signal, and therefore require a large signal dynamic range. Mechanical motion of the bucking coil may also result in a lower SNR measurement at the receiver coil. The positioning of the bucking coil with an HTEM system as disclosed herein may in some applications increase the accuracy of the measurements.

A typical setup of the HTEM system according to example embodiments may be to have the transmitter and receiver coil in a substantially concentric and substantially coplanar configuration. This concentric configuration can allow for a smaller setup and, may offer superior symmetry for the scattering response, which in turn may allow for easier interpretation of the scatterer geometry and better lateral resolution. By way of non-limiting example, in embodiments of a concentric dipole HTEM system, the dynamic range required for the pre-amplifier and the ADC is may be typically in the range 120 db, dictated by the ratio between the maximum signal amplitude and the input noise of the pre-amplifier.

In concentric dipole HTEM systems, to increase the dynamic range, one can place the receiver coil several meters above the transmitter coil to reduce the signal produced by the transmitter coil at the receiver. Alternatively, one can either use an auto-scaling pre-amplifier or switch the pre-amplifier gain between low-gain during the on-period and high-gain during the off-period. Use of adjustable gain amplifiers makes data acquisition more complex, but has the advantage of keeping the transmitter and receiver coils concentric, thus minimizing anomalous mapping profiles. For example, for a 40 dB adjustable gain pre-amplifier, a 16-bit ADC is sufficient to digitize the signal, whereas, if a 24-bit ADC is used, the system may apply a fixed gain preamplifier.

Sources of electrical noise at the receiver coil are numerous. The spurious signals may be produced by several sources that cause noise, such as: both the helicopter and other metallic parts of the system; lightning activity in the atmosphere; local AC power line interference; VLF radio waves in the 15-25 kHz frequency range; and thermal noise from the coil and the electronics. However, at low frequencies, for example, such as 0-100 Hz, a main source of noise at the airborne receiver coil is the microphonic noise produced by the motion of the coil in the magnetic field of the earth. The motion is produced by wind buffeting of the coil, vibration from the aircraft, and/or rubbing of the coil against the coil suspension system.

The potential means of increasing signal-to-noise ratio (SNR) at the receiver coil may not be straightforward due to the multiple factors that may affect the measurement. In order to minimize the noise produced in the frequency range of interest by various sources, it may be necessary to apply one or more of the following to embodiments: of the invention: a reduction in the movement of the receiver coil relative to the magnetic field of the earth; prevention of external mechanical noises from reaching the receiver coil; and minimization of the mechanical noises produced by the receiver coil suspension system.

In an example embodiment of the present invention a semi-rigid structure may be applied to build a large transmitter coil and bucking coil with an inherently large magnetic dipole moment and improved SNR. Larger structures, combined with the external suspension system, may also be utilized in embodiments of the present invention to improve flight stability and reduce the SNR requirements.

Figure 1:
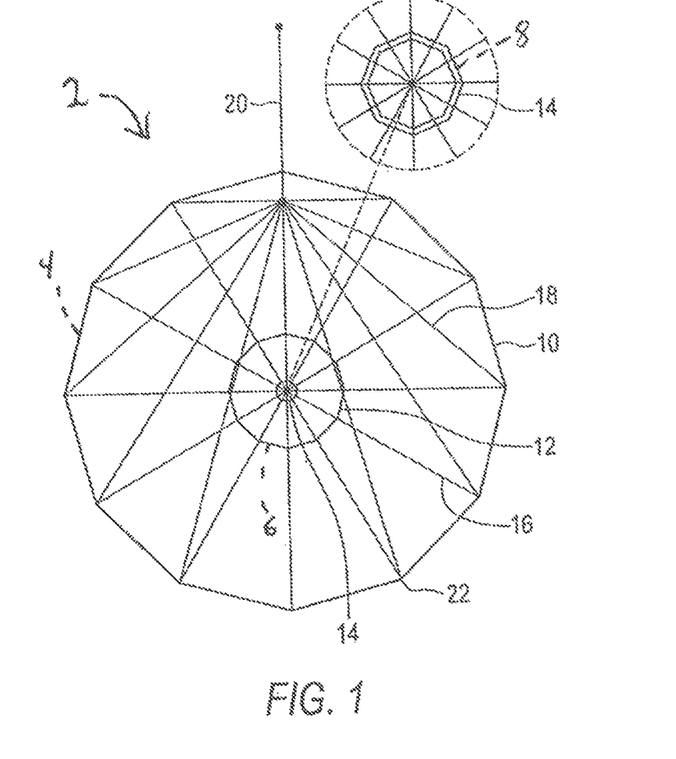
FIG. 1 is a view of the HTEM system according to an example embodiment of the present invention including an exploded view of the receiving coil.

As shown in FIG. 1, an HTEM system according to one example embodiment includes a tow assembly 2 having a transmitter coil 4, bucking coil 6 and receiver coil 8 which are each supported within a respective transmitter coil frame 10, bucking coil frame 12 and receiver coil frame 14. The transmitter coil 4, bucking coil 6 and receiver coil 8 are concentric in that they are substantially coplanar and have a common dipole axis. In the illustrated example embodiment, the bucking coil frame 12 is a dodecagonal bucking coil frame of a size for example, such as approximately 6.5 m (also shown in FIG. 2). This coil frame may be positioned with its axis at, or near, the center of the dodecagonal main transmitter coil frame 10, for example, of a size such as approximately 26 m. The receiver coil frame 14 may be further positioned with its: axis at the centre of the bucking coil frame 12. The three coil frames 10, 12, 14 may be connected by a system of radial cables 16, for example, such as approximately twelve radial cables. The radial cables 16 each have an inner end connected to a common central hub and an outer end connected to a respective location about the perimeter of the transmitter coil frame 10, and are under tension such that the transmitter coil frame 10 maintains a substantially consistent diameter during survey flights. The bucking coil frame 12, which has a smaller diameter than the transmitter coil frame, and the receiver coil frame 14, which has a smaller diameter than the bucking coil frame 12, are each secured to and supported by radial cables 16, such that the coil frames 10, 12 and 14 are maintained in a relatively stable concentric positions relative to each other during survey flights.

Figure 2:
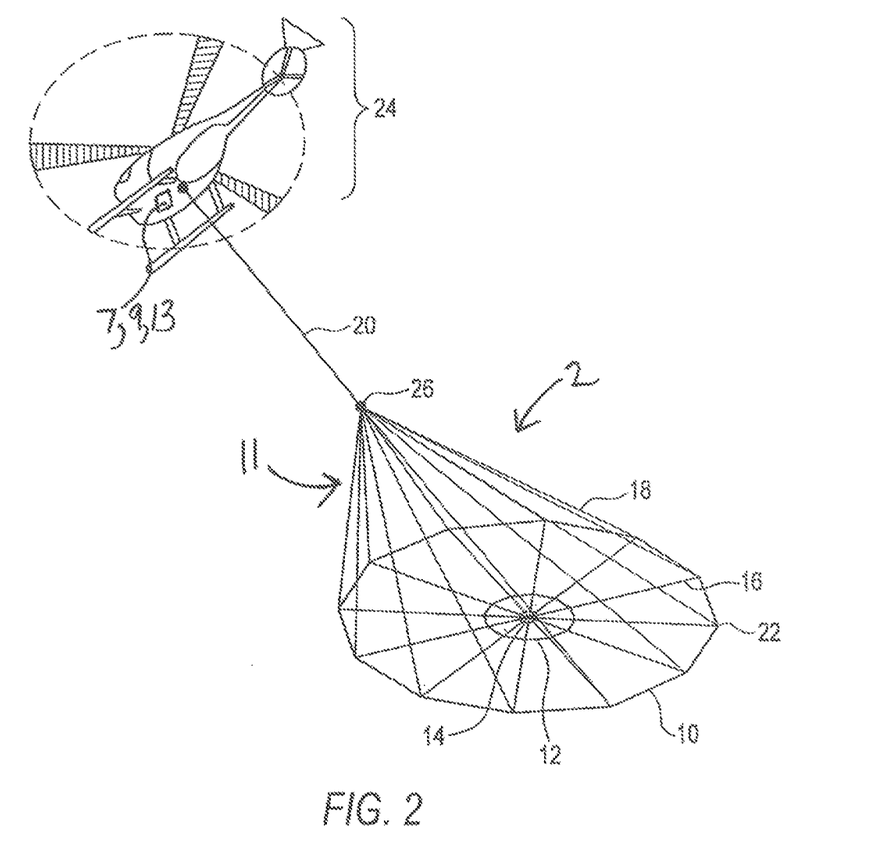
FIG. 2 is a side-view of the HTEM system of FIG. 1 in flight.

In an example embodiment, each of the coil frames 10, 12 and 14 are constructed from a series of tubular members that are connected end-to-end to form the polygonal frames shown in FIGS. 1 and 2. The transmitter, bucking and receiver coils 4, 6, 8 are each received internally within their respective tubular coil frames 10, 12 and 14. The transmitter and bucking coil frames are semi-rigid in that each of the frames, while formed from relatively rigid tubular members, has some ability to flex about its perimeter and also inter-frame connection between frames is achieved by radial cables 16 rather than rigid connectors. Examples of a suitable construction that can be applied to coil frames 10, 12 and 14 can be seen for example in U.S. Pat. No. 7,157,914, as well as U.S. patent application Ser. No. 12/036,657 (International application No. PCT/CA2009/000217).

The coil frames may be further attached to an external suspension system 2 formed of external cables 18. In one example embodiment, the suspension cables 18 each have a lower end releasably connected to a respective corner 22 of the polygonal transmitter frame 10, and an upper end connected to a suspension attachment cable 20. The suspension attachment cable 20 may further be releasably attached to a helicopter 24 or other aircraft such as an airplane or airship, whereby the system of frames that make up tow assembly 2 may be towed by the aircraft. In some example embodiments, additional suspension cables can be provided, each, having a lower end connected to a respective corner of bucking coil frame 12 and an upper end connected to suspension attachment cable 20. In another embodiment of the present invention, the external suspension system 2 may be formed of cables configured into, a mesh or net, such as shown for example in US 2008/0143130 A1.

As shown in FIG. 2, in one embodiment of the present invention the HTEM system of frames that make up tow assembly 2, including the main transmitter coil frame 10, bucking coil frame 12 and receiver coil frame 14, may be suspended in flight towed by a helicopter 24 flying at a constant surveying speed. The constant surveying speed may, by way of non-limiting example, be a speed such as approximately 30 m/s. In this particular embodiment the transmitter coil frame 10 may be supported by suspension system 11 such as from a connection point 26 that in addition to being vertically above the coil frame 10 also may be a horizontal distance away from the centre of the coil frame 10. The horizontal offset distance may be, by way of non-limiting example, approximately 1 m away from the coil centre. The suspension point 26 where the cables 18 of the suspension system 11 meet is attached to the helicopter by a long suspension attachment cable 20. The attachment cable 20 may have a length of, by way of non-limiting example, approximately 41 m. The external suspension system 11 may be formed such that during flight the coils may be positioned to be horizontal or substantially horizontal. In this regard, during flight the suspension attachment cable 20 may be positioned at an angle from the vertical. For example, the suspension attachment cable 20 may be, positioned at angle from the vertical, such as, approximately 35 degrees. Accordingly, in such an embodiment, the suspension system 11 is configured such that the coil frames can be maintained in a horizontal or substantially horizontal position during, flight. This in-flight position may be achieved through a consideration of several factors, including the drag produced by the wind, the weight of the structure and the external suspension cables or mesh.

In an example embodiment, system electronics 7 is located in the helicopter 24 and connected to the coils of the tow assembly 2 by conductors that extend along suspension cable 20. System electronics 7 includes a transmitter and bucking coil driver 9 as a current source for driving the transmitter and bucking coils 4, 6 in the manner discussed below, and data collection system 13 for measuring and processing signals from the receiver coil 8.

Figure 3:
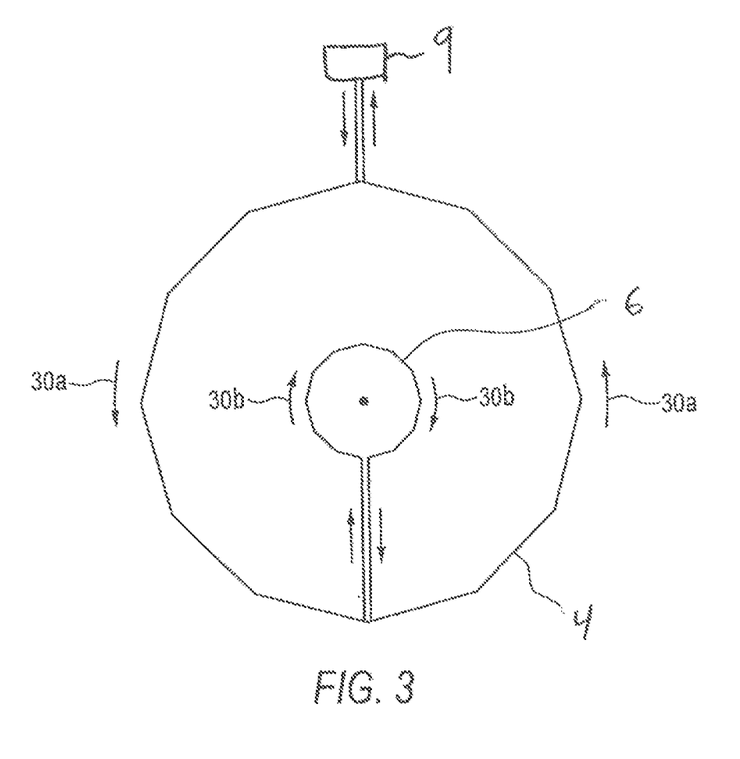
FIG. 3 is schematic top-view of the transmitter coil and bucking coil electrical connections in the HTEM system of FIG. 1.

As shown in FIG. 3, in one embodiment of the present invention, the main transmitter coil 4 may be an overall size, by way of non-limiting example, of approximately 26 m and may encompass four turns of wire, for example. Such turns may be positioned, inside the transmitter coil frame 10. In the same embodiment of the present invention the bucking coil 6 may be an overall size; by way of non-limiting example, of approximately 6.5 m and encompass one turn of wire positioned inside the bucking coil, frame 12. The number of turns incorporated in the transmitter coil or bucking coil are provided mentioned above are provided solely as examples. The turns in the transmitter coil and bucking coil may be fewer or greater than the number suggested in accordance with the requirements of specific embodiments of the present invention, or specific applications of the present invention.

The bucking coil 6 and main transmitter coil 4 may be electrically connected. This electrical connection may be achieved in series, having currents circulating in opposite directions 30a, 30b. The magnetic field at the centre of a coil is proportional to current direction and the number of wire turns, and inversely proportional to the overall diameter of the coil. For a concentric transmitter and bucking coils the primary magnetic field measured at the receiver coil placed at the centre of these coils may be approximately zero, as for each coil, the current times the number of wire turns divided by the coil radius is approximately the same.

Having a magnetic field at the centre of the coplanar transmitter coil and bucking, coil close to zero can be advantageous because the magnetic field can increase rapidly away from the centre. Consequently, if the transmitter and bucking coils are not concentric with the receiver coil, an unwanted background primary magnetic field may be produced at the receiver coil. It is desirable therefore that said coils be concentric or substantially concentric. Another consideration relating to the measurement is that a lack of stability during flight can cause a strong spurious signal at the receiver coil because the primary magnetic field is many orders of magnitude larger than the secondary magnetic field during the on-period.

To allow for the use of a semi-rigid bucking coil structure to reduce background magnetic field at the receiver coil during the on-period, when the EM measurements are made in time-domain, the signal averaged over several periods should be zero. The primary field produced by the transmitter coil and the bucking coil at the receiver coil should be zero. If a non-zero: signal average is measured, this value may be subtracted from the measured signal. This feature may result in a reduction of the requirements for a large signal dynamic range.

Figure 4A:
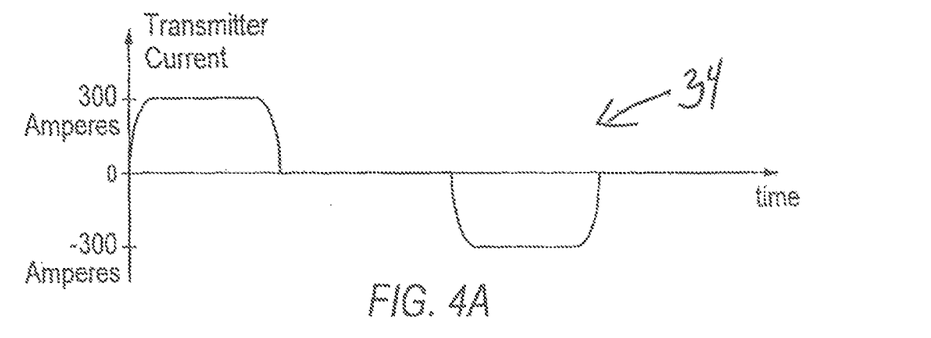
FIG. 4A is a graph-view of a current waveform applied to the transmitter coil and bucking coil of the HTEM system of FIG. 1.

As shown in FIG. 4A, in one embodiment of the present invention an electric current may be applied to the transmitter and bucking coils, by the driver 9. These coils may be connected in series, as shown in FIG. 3. Each current cycle or period includes a positive on-period and an off-period, followed by a negative on-period and an off period. In one non-limiting example embodiment of the present invention, the current waveform 34 may be symmetrical with a zero, or substantially zero, DC component, an approximate frequency of 30 Hz and approximate peak amplitude of 300 A. A skilled reader will recognize that other waveforms may be utilized in alternate embodiments or applications of the present invention.

Figure 4B:
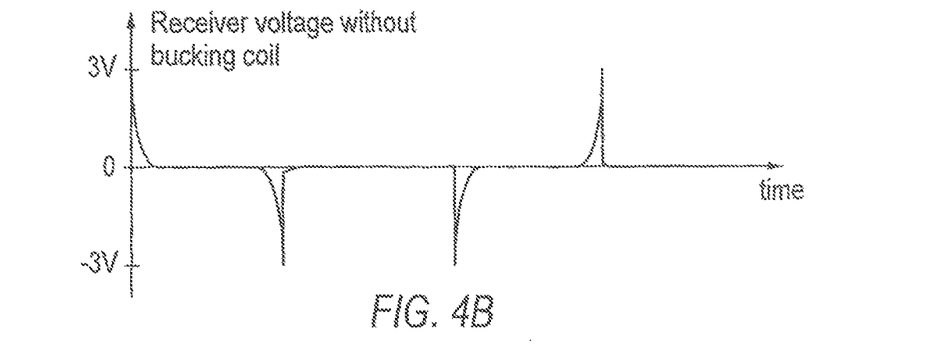
FIG. 4B is a graph-view of a voltage waveform measured at the receiver coil of a system that does not include a bucking coil.
Figure 4C:
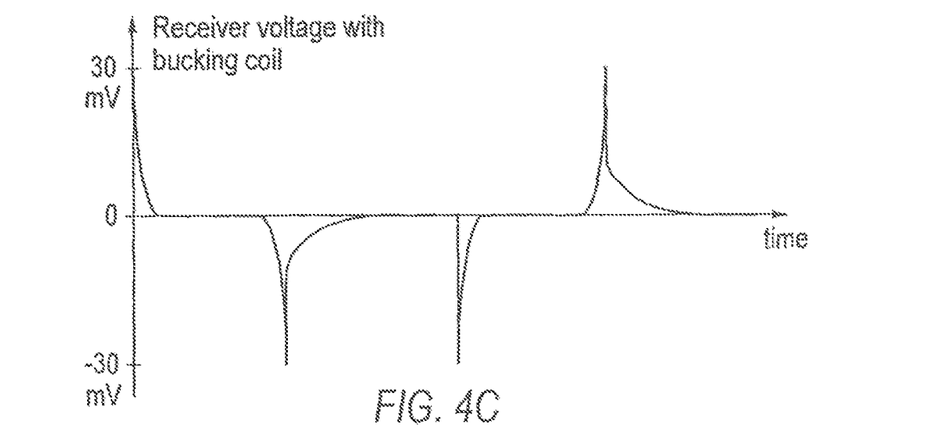
FIG. 4C is, a graph-view of a voltage waveform measured at the receiver coil of a system such as the HTEM system of FIG. 1. that includes a bucking coil.

FIG. 4B illustrates the on-period signal amplitude that may at the receiver coil 8 in the absence of bucking coil 6—as illustrated, the receiver voltage may be approximately 3V without a bucking coil. The introduction of the bucking coil in accordance with embodiments of the invention may cause the signal to be reduced substantially, for example to approximately 30 mV as shown in FIG. 4C. The transmitter off-period signal may have amplitude about 30 mV. Thus, the bucking coil may, in at least some applications, have the effect of substantially reducing the on-period signal at the location of the receiver coil, thus allowing for the SNR to be maximized by amplifying the receiver coil signal. The maximum amplification can be limited by the ADC input signal range. A skilled reader will recognize that other signals may be utilized in embodiments of the present invention.

Figure 5:
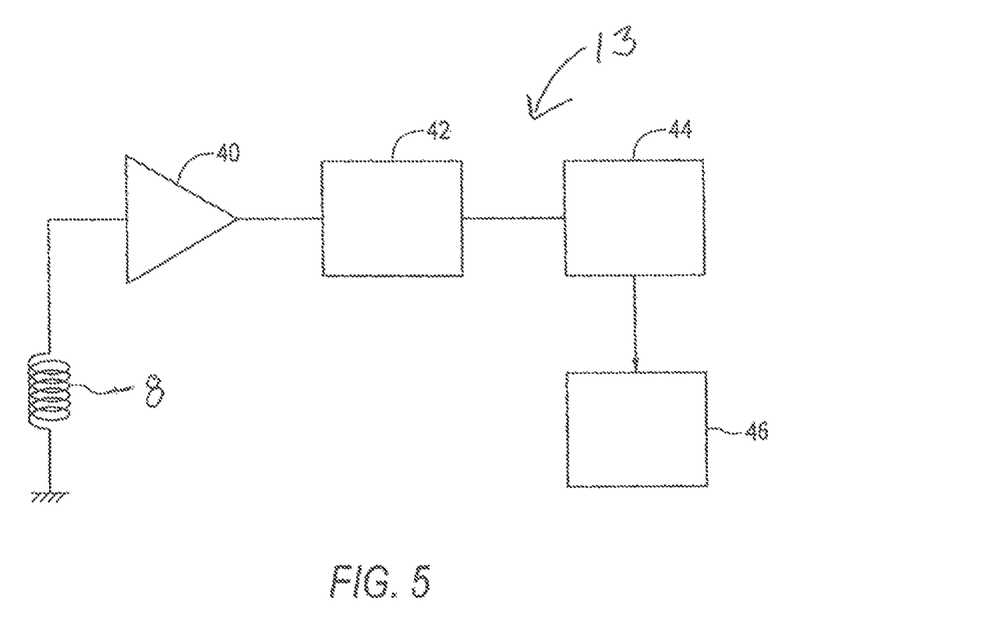
FIG. 5 is a schematic-view of the data acquisition system of the HTEM system of FIG. 1, according to example embodiments of the present invention.

An example embodiment of data acquisition system 13 will now be described with reference to FIG. 5. In one non-limiting example embodiment, the receiver coil 8 signal may be amplified, for example, approximately 100 times, by a low-noise pre-amplifier 40. The pre-amplifier 40 may be located on the tow assembly 11, with the remaining components of system 13 be located in the aircraft. Pre-amplifier 40 may produce a peak-to-peak signal, for example, such as an approximately 6V peak-to-peak signal. The signal may then be filtered by a low-pass anti-aliasing filter 42, for example, such as a filter of approximately 30 KHz. It may additionally be digitized by a bipolar ADC 44, for example, such as a 24-bit ADC, at a set rate, for example, such as a rate of approximately 100K or 200K samples per second. The data extracted through the digitization may then be passed to a processing and storing unit 46 capable of digitally processing and storing the data. A skilled reader will recognize that the amplification and other measurements provided are offered by way of example only, and that other amplifications and measurements may be utilized in embodiments of the present invention.

Figure 6:
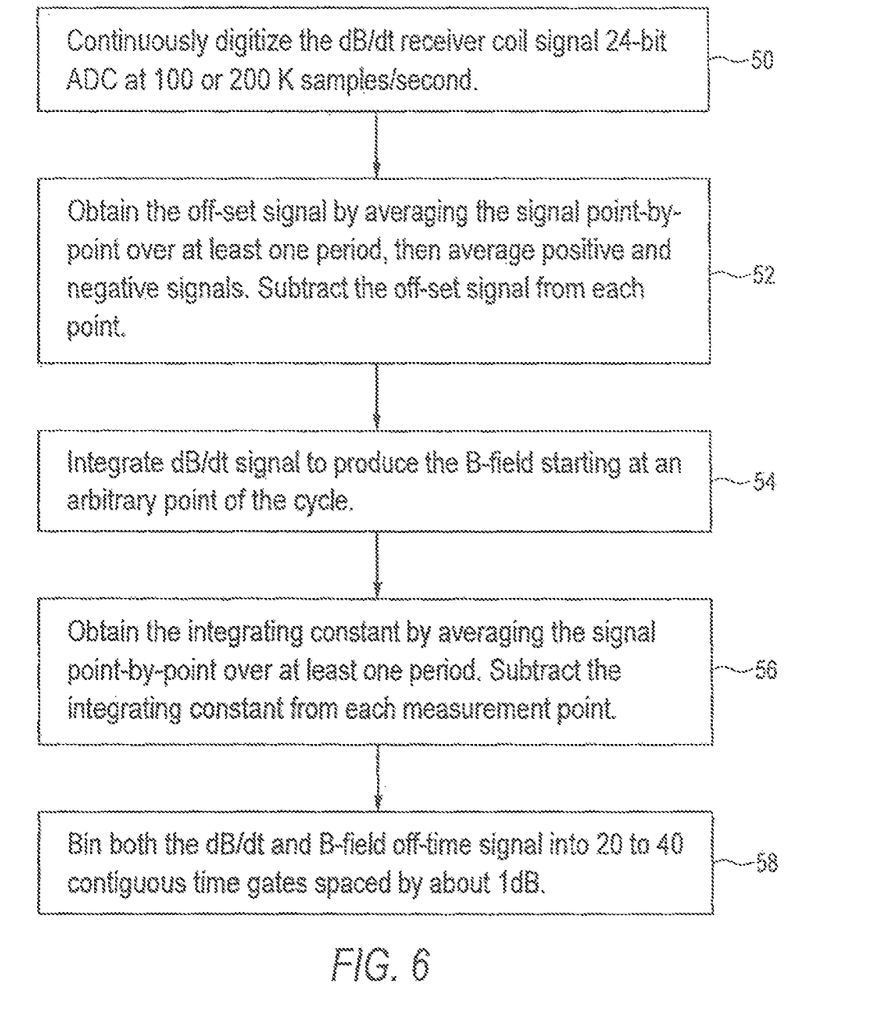
FIG. 6 illustrates a data analysis flow according example embodiments of the present invention to determine the B-field.

In one example embodiment of the present invention, the data acquisition system 13 performs signal processing such as that shown in FIG. 6. In such an embodiment, the receiver coil signal may be received at the bipolar ADC 44 of FIG. 5 whereby it may be continuously digitized (action 50). This digitization may, for example, occur at a rate such as 24-bit ADC at 100K to 200K samples per second. The digitized signal is then passed to processing and storage unit 46 for further processing. To eliminate the pre-amplifier off-set and temperature-dependent drifts, the signal at a given point of the waveform may be averaged point-by-point over at least one period or cycle (action 52). For example, in one embodiment, a set of 5 transmitter pulse cycles may be averaged. The waveform may additionally be averaged over the positive and negative semi-periods, or signals. These elements of averaging may be applied to obtain the off-set signal. The resulting DC signal may then be subtracted from each measurement point over the set of periods (action 52), whereby the off-set signal may be subtracted from each point.

Alternatively, in action 52 the waveform may be processed by subtracting from each point, the value of the waveform point one half period earlier. In the resultant waveform, the DC offset will be cancelled, and a linear drift in the original waveform would be reduced to a fixed offset in the resultant waveform. The resultant waveform may then be used as the input to the same processing algorithm, to obtain a second resultant waveform in which a linear drift in the input waveform would be completely cancelled. With repeated applications of the algorithm, additional resultant waveforms can be obtained in which higher order polynomial drifts would be completely cancelled. The skilled reader will understand that the repeated application of this algorithm can alternatively be embodied in a single algorithm which is mathematically equivalent and produces substantially identical results.

The digitized dB/dt signal is then integrated over the entire period (i.e. the on-time and off-time) by processing and storing unit 46 to produce a representation of the B-field (action 54). This integration may start from an arbitrary point of the cycle. To obtain the integrating constant (also known as the constant of integration), the binned signal may be averaged over at least one period. This may be achieved in a point-to-point manner, whereby an averaging over the positive and negative semi-periods occurs (action 56). The resulting DC signal, which, may be an integrating constant (i.e. constant of integration), may then be subtracted from each measurement point over the set of periods (action 56).

In the above procedure, the DC signal may be calculated by averaging over the entire waveform, or alternatively it may be obtained by averaging over parts of the off time. This will, reduce errors introduced by fluctuations in the amplitude of the primary signal detected by the receiver. Such fluctuations can be caused by deformations of the semiflexible frame.

As an additional step, the digital signal may be binned into gates during the off-timer period (action 58). For example, in one embodiment of the present invention 24 gates having equal or substantially equal time intervals in the logarithmic scale may be utilized. The logarithmic scale may include bins from 50 μs to 10 ms, separated by steps of approximately 1 db.

In one embodiment of the present invention, the integration of the dB/dt signal may be achieved in real time via microprocessors of the data acquisition system 13. In another embodiment of the present invention, the integration of the dB/dt signal may be performed post flight in accordance with the recorded time series of digitized points stored by processing and storing unit 46.

B-field data obtained through system 2 can be processed as a function of position to produce ground conductivity maps. The measurement of the B field, as disclosed herein, may in some applications improve the ability of the system to output a signal within the ADC dynamic range. This in turn, enables SNR to be improved by means of amplification of the receiver coil signal. Thus, in some example embodiments the dynamic range of the receiver coil signal can be reduced so that the entire waveform including the on-time can be acquired while reducing any impairment of accuracy or the noise level of the acquisition during the off-time.

It will be appreciated by those skilled in the art that other variations of the embodiments described herein may also be practiced without departing from the scope of the invention. In particular variations of the size, frequency and other suggested measurements may be applied in embodiments of the present invention as the measurements stated are provided by way of example only. Other modifications are therefore possible. For example, the size of the bucking coil may be varied to affect the primary field at the receiver. If the ADC can digitize both the on-time and off-time signals with sufficient resolution to maintain the signal to noise ratio, varying the size of the bucking coil can cause the primary field at the receiver coil to be a value other than approximately zero. Additionally, the size of the bucking coil can control the effect of a change in the number of turns in the transmitter coil, whereby altering the size of the bucking coil can aid in the maintenance of an approximate zero EM field during the on-time of the transmitter current.

The invention claimed is:

1. An electromagnetic measurement apparatus comprising:
   (a) a transmitter coil;
   (b) a bucking coil positioned substantially centrally within the transmitter coil;
   (c) a receiver coil positioned substantially centrally within the bucking coil;
   (d) a system of radial cables whereby the transmitter coil, bucking coil and receiver coil are connected in their relative positions;
   (e) an external suspension system of one or more external cables connected to the transmitter frame; and
   (f) one or more suspension attachment cables attached to the external suspension system;
   wherein the transmitter coil, bucking coil and receiver coil are positioned substantially concentrically relative to one another when the attachment cable is lifted vertically to a sufficient height to suspend the transmitter coil, bucking coil and receiver coil and the coils are positioned so as to function to achieve electromagnetic measurements to mitigate effects of residual currents in the transmitter coil during an off-time of the transmitter coil, the transmitter coil and the bucking coil each being flexible about a perimeter thereof
   wherein the transmitter coil, the bucking coil and the receiver coil are each supported within a respective transmitter coil frame, bucking coil frame and receiver coil frame that are spaced apart from each other and interconnected by the radial cables.

2. The electromagnetic measurement apparatus of claim 1 comprising an aircraft having the one or more suspension attachment cables attached thereto, whereby the electromagnetic measurement apparatus is lifted vertically and the external suspension system being connected to the transmitter coil is operable to suspend the transmitter coil, the bucking coil and the receiver coil in flight.

3. The electromagnetic measurement apparatus of claim 2 wherein the aircraft is a helicopter, single engine airplane, or other aircraft capable of supporting the weight of the electromagnetic measurement apparatus in flight.

4. The electromagnetic measurement apparatus of claim 1 comprising one or more suspension attachment cables and an external suspension system capable of a suspending the electromagnetic measurement apparatus in a substantially horizontal position when submitted to drag produced by the wind, the weight of the electromagnetic measurement apparatus and the external suspension system configuration during flight.

5. The electromagnetic measurement apparatus of claim 1 wherein the external suspension system is formed of a mesh of cables.

6. The electromagnetic apparatus of claim 1 wherein the transmitter coil and the bucking coil are driven to generate periodic pulses each having a positive on-time followed by an off-time followed by a negative on-time followed by an off-time, the apparatus further comprising a signal processing system for producing a B-field measurement, the signal processing system being configured to: obtain and digitize a receiver coil signal from the receiver coil; integrating the digitized receiver coil signal over at least one entire period; and averaging positive and negative half-cycles of the integrated digitized receiver coil signal over one or more periods to obtain a constant of integration and derive the B-field measurement.

* * * * *